United States Patent
Sorvari et al.

(10) Patent No.: US 6,355,079 B1
(45) Date of Patent: Mar. 12, 2002

(54) PRODUCTION METHOD FOR MULTILAYER FILTER MATERIAL AND MULTILAYER FILTER MATERIAL

(75) Inventors: Juha Sorvari, Kotka; Kaj Lindblad, Turku, both of (FI)

(73) Assignee: BKI Holding Corporation, Wilmington, DE (US)

( * ) Notice: Subject to any disclaimer, the term of this patent is extended or adjusted under 35 U.S.C. 154(b) by 0 days.

(21) Appl. No.: 09/585,090

(22) Filed: Jun. 1, 2000

Related U.S. Application Data

(63) Continuation of application No. PCT/FI99/00781, filed on Sep. 23, 1999.

Foreign Application Priority Data

Oct. 1, 1998 (FI) .................................................. 982127

(51) Int. Cl.$^7$ ........................... B01D 29/56; B01D 39/18
(52) U.S. Cl. ........................ 55/486; 55/528; 55/DIG. 5
(58) Field of Search .......................... 55/527, 528, 487, 55/486, DIG. 5

(56) References Cited

U.S. PATENT DOCUMENTS

| | | | | | |
|---|---|---|---|---|---|
| 3,740,797 | A | * | 6/1973 | Farrington | 19/156.3 |
| 4,661,132 | A | * | 4/1987 | Thornton et al. | 55/486 |
| 5,283,106 | A | * | 2/1994 | Seiler et al. | 428/198 |
| 5,674,302 | A | * | 10/1997 | Nakayama et al. | 55/385.3 |
| 5,800,586 | A | * | 9/1998 | Cusict et al. | 55/486 |
| 5,820,645 | A | * | 10/1998 | Murphy, Jr. | 55/385.3 |
| 6,267,252 | B1 | * | 7/2001 | Amsler | 210/490 |

* cited by examiner

*Primary Examiner*—Robert A. Hopkins
(74) *Attorney, Agent, or Firm*—Darby & Darby

(57) ABSTRACT

The present invention provides a unitary multi-layer filtering material and a method for producing a multi-layer filtering material. The multi-layer filtering material comprises at least one filtering layer formed by a dry forming technique and comprises natural fibers and/or plastic fibers and a binder material and/or binder fibers. The multi-layer filtering material further comprises at least one strengthening layer formed by a dry forming technique and comprises natural fibers and/or plastic fibers and binder material and/or binder fibers. The strengthening layer is airlaid onto either side of the filtering layer. The fibers of the filtering and strengthening layers are heat bonded to form a unity.

5 Claims, 1 Drawing Sheet

PRODUCTION METHOD FOR MULTILAYER FILTER MATERIAL AND MULTILAYER FILTER MATERIAL

This a continuation of International Application Ser. No. PCT/FI99/00781 filed Sep. 23, 1999, the entire disclosure of which is incorporated herein by reference.

General Introduction

The object of the invention is a method for producing multi-layer filtering material, and a multi-layer filtering material. According to the method, at least one filtering layer of natural fibres, such as wood pulp fibres and/or plastic fibres and binder material and/or binder fibres is formed by using the dry forming technique and the filtering layer is bonded by heat.

In addition, the object of the invention is a multi-layer filtering material comprising at least one filtering layer of natural fibres, such as wood pulp fibres and/or plastic fibres and binder material and/or binder fibres, said filtering layer being formed by using the dry forming technique and being bonded by heat, said filtering material further comprising a strengthening layer formed of natural fibres, such as wood pulp fibres and/or plastic fibres and binder material and/or binder fibres, said strengthening layer being arranged to be in contact with the filtering layer.

BACKGROUND OF THE INVENTION

At its simplest, the filtering material of air filters comprises of only one material layer. This kind of filtering material is known, for example, from U.S. Pat. No. 4,765,812. In efforts to improve the filtering characteristics, the filtering material is increasingly often formed of either at least two separate layers, which are bonded together, or of at least one finished layer, depending on the desired filtering characteristics.

The filtering material produced in this manner is used in the manufacture of different kinds of filters. To an increasing extent, as the standard of filtering properties required rises, there has been a tendency to go over to multi-layer solutions. The problem in this connection has been the additional production stage of joining two or more layers together or the additional finishing stage.

SUMMARY OF THE INVENTION

The function of the invention is to provide a method for producing a filtering material with good adjustable filtering characteristics and which is nevertheless advantageous in terms of manufacturing technology. This kind of multi-layer filtering material can be produced by the production method in accordance with the invention, characterised in that, in addition to the forming stage of the filtering layer, said method further comprises the steps of forming at least one strengthening layer of natural fibres, such as wood pulp fibres and/or plastic fibres and binder material and/or binder fibres, said strengthening layer being formed by using the dry forming technique and said layer being arranged so as to be in contact with said at least one filtering layer in order to form a unity, said unity being formed at the same time as the heat bonding of the filtering layer.

Preferably, this can be achieved by forming said at least one strengthening layer on one or both surfaces of the filtering layer. In practice, this can be done in such a way that when the filtering material web is being formed by the dry forming technique, one or more filtering layer/s are formed first, and on top of said filtering layer/s one or more strengthening layer/s are formed before the unity is bonded by heat. Alternatively, before forming the filtering layer/s, one or more strengthening layer/s are formed, on top of which first the filtering layer/s and then the strengthening layer/s are formed before the unity is bonded by heat. As mentioned above, the filtering layer can be formed of several layers one on top of another, depending on the desired filtering characteristics. The most essential characteristic of the strengthening layer is to improve the strength characteristics of the filtering material. In a multi-layer structure according to the invention, the filtering layer or layers are porous layers, giving good filtering characteristics, and with the help of one or more strengthening layer/s the material can be given the required strength properties.

A multi-layer filtering material according to the invention is characterised in that said at least one strengthening layer is formed by the dry forming technique, said strengthening layer being formed so as to be in contact with said filtering layer and bonded in connection with the heat bonding of the filtering layer, said strengthening layer forming a seamless unity with said at least one filtering layer. Thus the multi-layer filtering material in accordance with the invention is produced entirely by the dry forming technique in one continuous process without any additional production stages.

BRIEF DESCRIPTION OF THE DRAWINGS

The method in a accordance with the invention and the multi-layer filtering material thereby produced is now described in greater detail with reference to the attached drawing, wherein.

DETAILED DESCRIPTION OF THE PREFERRED EMBODIMENTS

Figure 1:
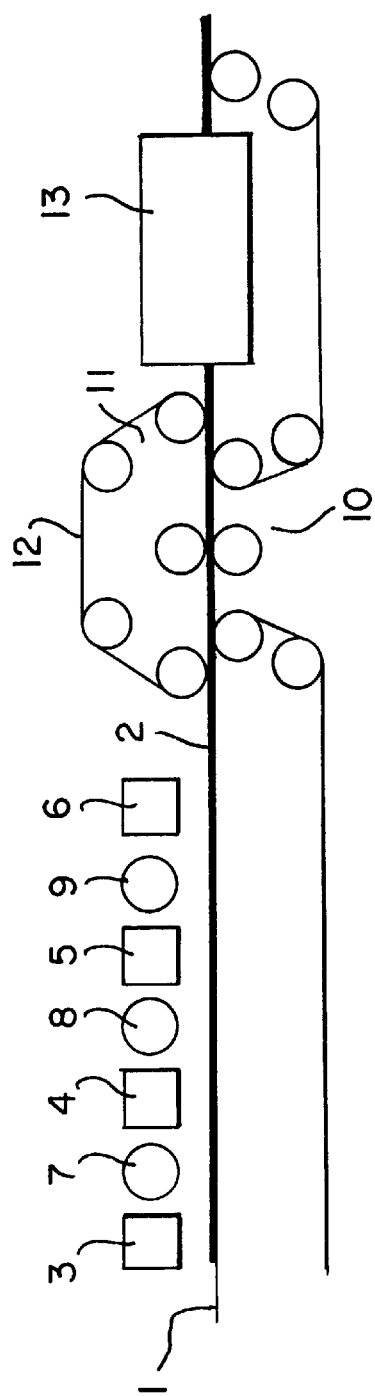
FIG. 1 shows the filtering material production line in accordance with the invention and FIG. 2 shows a cross-section of the filtering material according to the invention.

FIG. 1, by way of an example, shows a functional diagram of the dry forming line, by means of which the method according to the invention can be implemented. In the dry forming line, a material web 2 is formed on the wire 1 with the help of four forming boxes or formers numbered 3, 4, 5 and 6. Then the filtering layers formed of natural fibres, such as wood pulp fibres, plastic fibres or a mixture of natural fibres and plastic fibres are formed by formers 4 and 5. In case the strengthening layer/s are formed only on one surface of the filtering layer/s, former 6 of the line according to FIG. 1 is used. If the strengthening layer/s are placed on both sides of the filtering layer/s, formers 3 and 6 are used. The strengthening layers can be formed of natural fibres, plastic fibres or a mixture of natural fibres and plastic fibres. An air fibre mixture is blown into the formers extending transversely across the entire width of the wire, said air fibre mixture is mixed and screened in a manner known in the prior art in order to form an even layer on the wire below. There can be as many formers as required by the desired strength of the material web, but there must be at least two formers, said formers being placed consecutively on the same production line, in which case the strength of the material web is gradually increased with the help of the formers until the desired strength is reached. This means that the ratios of the natural fibres and plastic fibres in the layers of material web formed by the different formers can vary.

Preferably, the natural fibres are relatively long-fibred mechanical or chemical pulp and the plastic fibres can be of any kind suitable for dry forming, for example bi-component fibres, the core of said fibres being of polypropylene and the sheath being of polyethene.

If necessary, superabsorbent particles can be added to the material web 2 with the help of three scattering devices numbered 7, 8 and 9. Suitable superabsorbent agents include activated carbon, activated clay, silica gels or cross linked polyacrylates. The scattering devices can be placed between the formers as many as required.

The contents of different components in the filtering layer can be as follows: 0–100% natural fibres (wood pulp fibres), 0–100% plastic fibres and 0–75% superabsorbent agents. The grammage of the filtering layer can be, for example, 30–700 g/m². The content limits of the strengthening layer can be, for example, as follows: 0–100% natural fibres (wood pulp fibres), 0–100% plastic fibres and 0–75% superabsorbent agents. The grammage of the strengthening layer can be, for example, 5–150 g/m². Correspondingly, the grammage of the entire filtering material can be, for example, 35–1000 g/m².

After the forming stage, the lower surface of the filtering material is calendered with the roll 10 on the line according to FIG. 1. The calendering of the lower surface of the strengthening layer or the filtering layer takes place as the material web is sucked against the wire 12 as it winds on the suction box 11. The patterning which enhances the filtering characteristics can be achieved with the help of either a smooth calendering roll and a patterned wire or a patterned calendering roll and a smooth wire. After the calendering, the material web is bonded by heat in the dryer 13. Correspondingly, the fibres of both the filtering layer/s and the strengthening layer/s are bonded together at one time.

Figure 2:
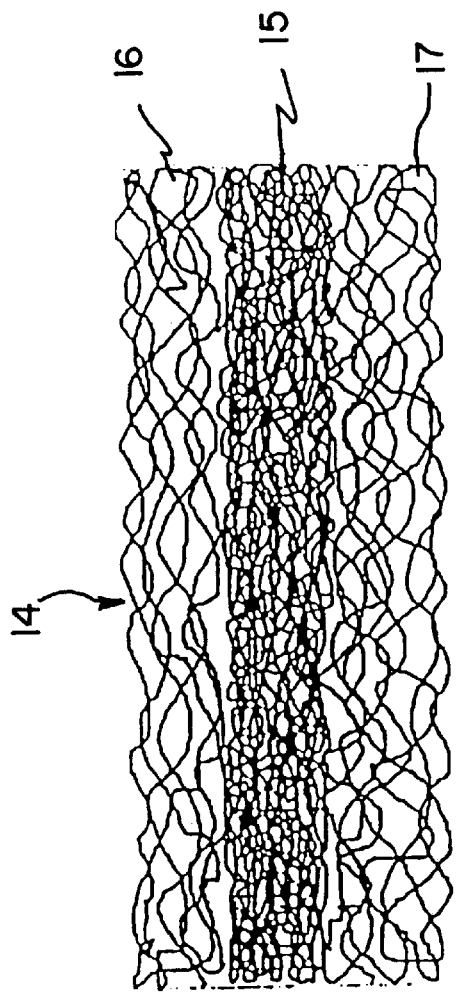

FIG. 2 shows a cross-section of an embodiment which is by way of an example of the filtering material 14 according to the invention, said filtering material comprising a filtering layer 15 formed of natural fibres, plastic fibres or natural fibres and plastic fibres, said filtering material further comprising strengthening layers 16 and 17 formed of natural fibres, plastic fibres or natural fibres and plastic fibres. There are two strengthening layers in the filtering material described in FIG. 2. If there were only one strengthening layer, the lower strengthening layer 17 would be missing from the cross-section of FIG. 2. The structure would otherwise correspond to the one shown in FIG. 2. As FIG. 2 shows, the entire multi-layer filtering material 14 is essentially one and the same seamless material forming a seamless unity, the surfaces of said material being the strengthening layers 16 and 17 formed of natural fibres, plastic fibres or natural fibres and plastic fibres, and the core of said material being the filtering layer 15 formed of natural fibres, plastic fibres or natural fibres and plastic fibres. The thickness of the layers can be altered and regulated during the forming stage, the only essential thing being that the layers are formed on the same line and are bonded together in one stage. Typically, the end product is made from the filtering material 14 by cutting pieces of appropriate size from the web. Naturally, any necessary finishing procedures depend on the use of the end product.

The filtering material according to the invention is bonded by heat using binder material, binder fibres or both binder material and binder fibres. Both the filtering layer or layers and the strengthening layer or layers are bonded with these materials. These binder materials or binder fibres are conventionally used in the field and are commonly used in the manufacture of products made by air laying. Therefore, said binder materials or binder fibres are not described in detail in this connection.

As mentioned above, the characteristics of the filtering material according to the invention can vary considerably. The grammage can vary from 35 to 100 g/m² and the thickness from 100 to 5000 μm. The tensile strength in machine direction can be from 0.05 to 10 kN/m. The bulk of the material can be from 2 to 100 cm³/g.

The method for producing a multi-layer filtering material according to the invention as well as the multi-layer filtering material produced thereby has been described above only by means of a few embodiments which are by way of examples and it is to be understood by a person skilled in the art that different applications of the invention are not restricted to the examples above, but can vary within the attached patent claims.

What is claimed is:

1. A method for producing a filtering material, said method comprising the steps of forming by a dry forming technique at least one filtering layer (15) of natural fibers and/or plastic fibers and binder material and/or binder fibers and bonding the filtering layer by heat, characterized in that said method also comprises the steps wherein at least one strengthening layer (16,17) is formed by a dry forming technique, said layer being formed so as to be in contact with said at least one filtering layer (15) and in connection with the forming stage of the filtering layer, said strengthening layer being formed of natural fibers and/or plastic fibers and binder material and/or binder fibers and said at least one strengthening layer (16,17) is bonded with said at least one filtering layer (15) in order to form a unity (14), said unity being formed in connection with the heat bonding of the filtering layer, wherein the filter layer has a density of 30–700 g/m² and the strengthening layer has a density of 5–150 g/m².

2. The method of claim 1 further comprising scattering superabsorbent material onto the forming filter material.

3. A multi-layer filtering material, comprising at least one filtering layer (15) formed by a dry forming technique, said filtering layer being formed of wood pulp fibers or mixtures of wood pulp fibers and plastic fibers and binder material and/or binder fibers, said filtering material being bonded by heat, and at least one strengthening layer (16,17) arranged to be in contact with the filtering layer, said strengthening layer being formed of wood pulp fibers or mixtures of wood pulp fibers and plastic fibers and binder material and/or binder fibers, characterized in that said at least one strengthening layer is formed so as to be in contact with said at least one filtering layer (15) formed by a dry forming technique, said strengthening layer being bonded in connection with the heat bonding of the filtering layer, and said strengthening layer (16,17) forming a seamless unity (14) with said at least one filtering layer.

4. The filtering material of claim 3 wherein the wood pulp fibers are long-fibered mechanical or chemical pulp fibers.

5. The filtering material of claim 3 further comprising superabsorbent material.

* * * * *